US00RE43102E

(19) United States
(12) Reissued Patent
Kim et al.

(10) Patent Number: US RE43,102 E
(45) Date of Reissued Patent: Jan. 10, 2012

(54) APPARATUS AND METHOD FOR DISPLAYING ADDITIONAL INFORMATION

(75) Inventors: Jae Ryong Kim, Kyonggi-do (KR); Mun Youl Lee, Kyonggi-do (KR); Sung A Cho, Seoul (KR); Sang Won Chung, Kyonggi-do (KR); Se Jung Sohn, Seoul (KR)

(73) Assignee: LG Electronics Inc., Seoul (KR)

(21) Appl. No.: 11/489,736

(22) Filed: Jul. 20, 2006

Related U.S. Patent Documents

Reissue of:
(64) Patent No.: 6,766,528
Issued: Jul. 20, 2004
Appl. No.: 09/492,358
Filed: Jan. 27, 2000

(30) Foreign Application Priority Data

Jan. 27, 1999 (KR) ..... 1999-2597
Jan. 27, 1999 (KR) ..... 1999-2598

(51) Int. Cl.
*H04N 5/445* (2006.01)
*H04N 7/173* (2006.01)

(52) U.S. Cl. ..... 725/113; 348/465; 348/563; 725/112

(58) Field of Classification Search ..... 348/563, 348/569, 570, 564, 553, 552, 460–474; 725/39, 725/40, 51, 52, 113, 110, 53; 709/219, 218
See application file for complete search history.

(56) References Cited

U.S. PATENT DOCUMENTS 5,760,838 A 6/1998 Adams et al.
5,929,849 A * 7/1999 Kikinis ..... 725/113
6,172,677 B1 1/2001 Stautner et al.
6,198,509 B1 3/2001 Dougherty et al.
6,285,407 B1 9/2001 Yasuki et al.

FOREIGN PATENT DOCUMENTS

EP 901284 A2 * 3/1999
KR 10-1998-007135 10/1998

OTHER PUBLICATIONS

Korean Office Action dated Nov. 29, 2005 for Application No. 10-1999-0002598, Non-English language, 3 pages.

* cited by examiner

*Primary Examiner* — Michael Lee
(74) *Attorney, Agent, or Firm* — Fish & Richardson P.C.

(57) ABSTRACT

An apparatus and method for displaying additional information on a TV program is disclosed. In the present invention, both a detail information included in the additional information transmitted by a broadcasting station or detail information obtained from an external source such as the Internet may be displayed to a user, it requested.

23 Claims, 3 Drawing Sheets

APPARATUS AND METHOD FOR DISPLAYING ADDITIONAL INFORMATION

Matter enclosed in heavy brackets [ ] appears in the original patent but forms no part of this reissue specification; matter printed in italics indicates the additions made by reissue.

BACKGROUND OF THE INVENTION

1. Field of the Invention

The present invention relates to a TV, and more particularly, to a device and method for displaying additional information to a TV program.

2. Background of the Related Art

Generally, an audio/video signal transmitted to a TV also includes additional information data. Particularly, the additional information data, such as a weekly broadcasting guide information, is provided to better serve the viewers. Therefore, a TV receiver requires a demultiplexer, by which a received signal is separated into a video signal, an audio signal; and additional information data. Namely, the demultiplexer separates either a Transport Stream (TS) or a Program Stream (PS) which includes a plurality of elementary data streams such as the video, audio and other additional information combined by a broadcasting station for storage or for transmission of data.

Thus, the additional information may be displayed on a TV screen with or separately from a broadcasted image by an Electronic Program Guide (EPG). Particularly, the EPG contains basic TV guides for program times and channels as well as detail information such plots, the type of program, whether the program is pay TV, or other available services. Thus, viewers can obtain information about present and future TV programs directly from a TV screen, without the need of other guide mediums such as a newspaper. As the number of channels and programs increase, the EPG provides a more convenient tool in searching for and/or viewing a program.

FIG. 1 is a block diagram of a typical digital TV receiving and displaying program guide information. The digital TV includes a remote control 101 which allows viewers or users to control the TV by radio signals; a remote receiver 102 which receives signals output by the remote control 101 and outputs a key code value corresponding to a key input by the user through the remote control 101; a tuner 103 which tunes frequency corresponding to a desired channel among the signals received through an antenna or a cable; a demodulator 104 which demodulates the tuned channel frequency by a reversed modulation; a demultiplexer 105 which demultiplexes and separates the demodulated signal into an audio/video signals and additional guide information data; an audio/video decoder 106 which decodes the audio/video signal separated by the demultiplexer 105; a display unit 107 which displays the decoded signal; a storage 108 which stores the program guide information data separated by the demultiplexer 105; a controller 109 which controls the tuner 103, the demodulator 104, the demultiplexer 105, the storing and the displaying of the program guide information data, in accordance with the signal from the remote receiver 102; and a memory 110 which temporarily stores the data from the storage 108 in accordance with the control of the controller 109.

To operate the digital TV receiver, a user selects program channels transmitted through an antenna or a cable using the remote control 101 such as by pressing keys. The remote receiver 102 then outputs to the controller 109 a key code value corresponding to the key input from the remote control 101. The controller 109 outputs a control signal for tuning a desired channel frequency in accordance with the key code value of the remote receiver 102. Additionally, the controller 109 respectively outputs control signals to the demodulator 104 and the demultiplexer 105, for demodulating the tuned signal and for demultiplexing the demodulated signal.

The tuner 103 tunes a selected channel frequency among the signals received through an antenna or a cable in accordance with the control signal of the controller 109, and outputs the tuned channel frequency to the demodulator 104. The demodulator 104 demodulates the tuned channel frequency under the control of the controller 109. For example, if the input signal is Vestigial Side Band (VSB) modulated, the demodulator 104 performs a VSB demodulation. On the other hand, if the input signal is Orthogonal Frequency Division Multiplexing (OFDM) modulated, the demodulator 104 performs all OFDM demodulation to output a demodulated signal to the demultiplexer 105.

The demodulated signal input to the demultiplexer 105 is a multiplexed transport packet including the audio signal, the video signal and the additional information data. Thus, the demultiplexer 105 demultiplexes the signal under the control of the controller 109 and separates the audio/video signals from the additional information data. The audio/video signals are output to the audio/video decoder 106 and the additional information including the program guide information such as the title, rating, time and plot of a program is stored in the storage 108.

The audio/video decoder 106 decodes the audio/video signals and outputs the decoded signal to the display unit 107. The display unit 107 displays the decoded video signals on a TV screen and plays the decoded audio signals through a speaker. The additional information data regarding a program being displayed on the display unit is read from the storage 108 by the controller 109 and temporarily stored in the memory 110. The controller 109 then informs users through the display unit 107 that there is additional information for the program being displayed. If there is a request to view the additional information from the user, the controller 109 reads the additional information data stored in the memory 110 and displays the information on the display unit 107.

Therefore, the digital TV as described above can display information regarding the program such as a program content, program time, names of heroes, if additional information is transmitted by broadcasting stations or external program providers. But, a user's request for more information cannot be met due to the limitation of the EPG data.

SUMMARY OF THE INVENTION

Accordingly, an object of the present invention is to solve at least the problems and disadvantages of the related art.

An object of the present invention is to provide an apparatus and method for displaying detailed additional information on objects in a program.

Another object of the present invention is to provide an apparatus and method for displaying additional information from an external source such as the Internet, thereby providing a variety of information even if information on a program is not included in the additional information.

Additional advantages, objects, and features of the invention will be set forth in part in the description which follows and in part will become apparent to those having ordinary skill in the art upon examination of the following or may be learned from practice of the invention. The objects and advantages of the invention may be realized and attained as particularly pointed out in the Appended claims.

To achieve the objects and in accordance with the purposes of the invention, as embodied and broadly described herein, an apparatus for displaying additional information includes a data separator for receiving broadcasting signals, selecting and demodulating a desired program, and separating the additional information from the demodulated signal; a decoder for detecting detail information on each object in the program being displayed from the additional information, and decoding the detail information to store the detail information on objects; a storage for storing the data decoded at the decoder; a display for displaying detail information on each object stored in the storage at preset positions of the program being displayed at the time when detail information display of the objects is selected through a selector; and a controller for controlling the separation of the additional information data, the decoding at the decoder, the data storage at the storage, and the display of various detail information.

In the above apparatus, the storage stores a table which includes a number of object tables, table IDs, and object names corresponding to characteristic tables for objects in the decoded program. Each characteristic table corresponding to an object in the decoded program includes information such as a media type, a number of frames, positions, sites and state of the object. Thus, the controller informs users that there is detail information for each of the objects stored in the storage.

Also, the selector may be one of a panel key attached to the display, a remote control outputting a radio signal according to a user input, a keyboard or a mouse which outputs a radio or cable signal, Moreover, the above embodiment may further include a modulation/demodulation unit to search a host or a server in a program provider for detail information selected by a user when the user requests for detail information not included in the additional information.

In another embodiment of the present invention, an apparatus for displaying additional information includes a data separator for receiving broadcasting signals, selecting and demodulating a desired program, and separating additional information from the demodulated signal; a storage for storing the additional information data; a controller for controlling the data separation at the data separator, the display of data stored in the storage, and also controlling extraction of an item list for to the user to select and display; and a display for displaying the program and the data stored in the storage under the control of the controller, and displaying the item list related to each object in the present program.

Also, a modulation/demodulation unit may be added for detecting the detail information of items selected from the Internet and storing the information in the storage if at least one item list is selected through the selector.

In still another embodiment of the present invention, a method for displaying additional information includes (1) detecting detail information for each object in a program being displayed from the additional information data, and storing the detail information sorted by objects, (2) extracting the stored detail information for each object, and displaying the detail information at preset positions around the objects being displayed, when a user selects to view the detail information on objects, and (3) controlling the additional information separation, the data storage, and the display of a variety of detail information.

Here, the additional information data is transmitted, with information table IDs, media types, a number of frames, positions, sizes, and states for the object displayed in each frame. If the user requests for more detail information than the detail information on the object already being displayed, the method further includes searching an external server, host, or the Internet for the more detail information on the object; and displaying more detail information at preset positions around the object being displayed.

In still a further embodiment of the present invention, a method for displaying additional information includes extracting and displaying an item list the user may possibly want to view which are not included in the additional information; and searching the Internet for the detail information on an item if at least one time is selected from the item list; and displaying the selected item.

BRIEF DESCRIPTION OF THE DRAWINGS

The invention will be described in detail with reference to the following drawings in which like reference numerals refer to like elements wherein.

DETAILED DESCRIPTION OF THE PREFERRED EMBODIMENTS

Figure 2:
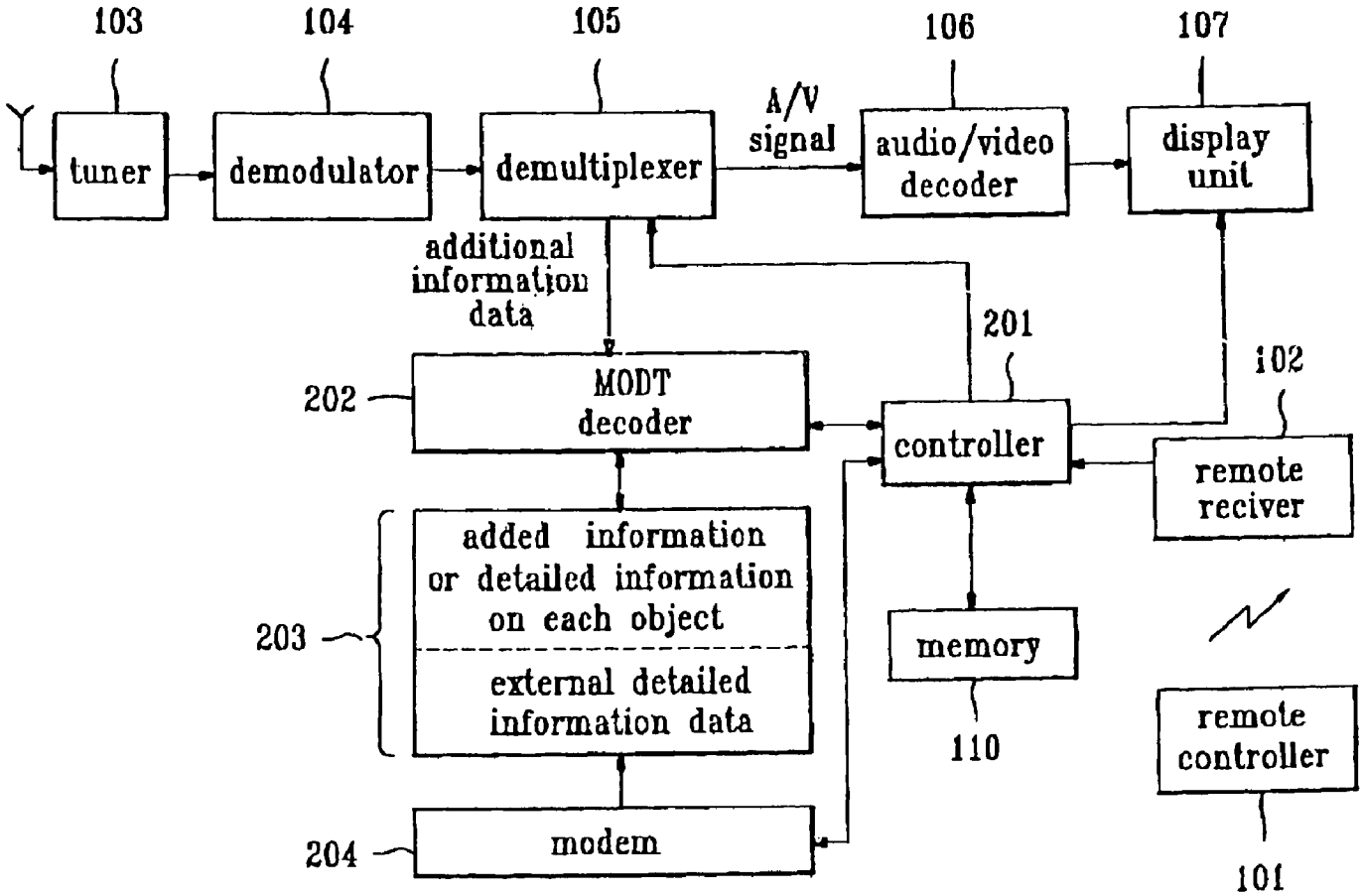
FIG. 2 is a block diagram of an apparatus for displaying additional information in accordance with a preferred embodiment of the present invention.

Reference will now be made in detail to the preferred embodiments of the present invention, examples of which are illustrated in the accompanying drawings. FIG. 2 is a block diagram of an apparatus for displaying additional information in accordance with a preferred embodiment of the present invention.

Figure 1:
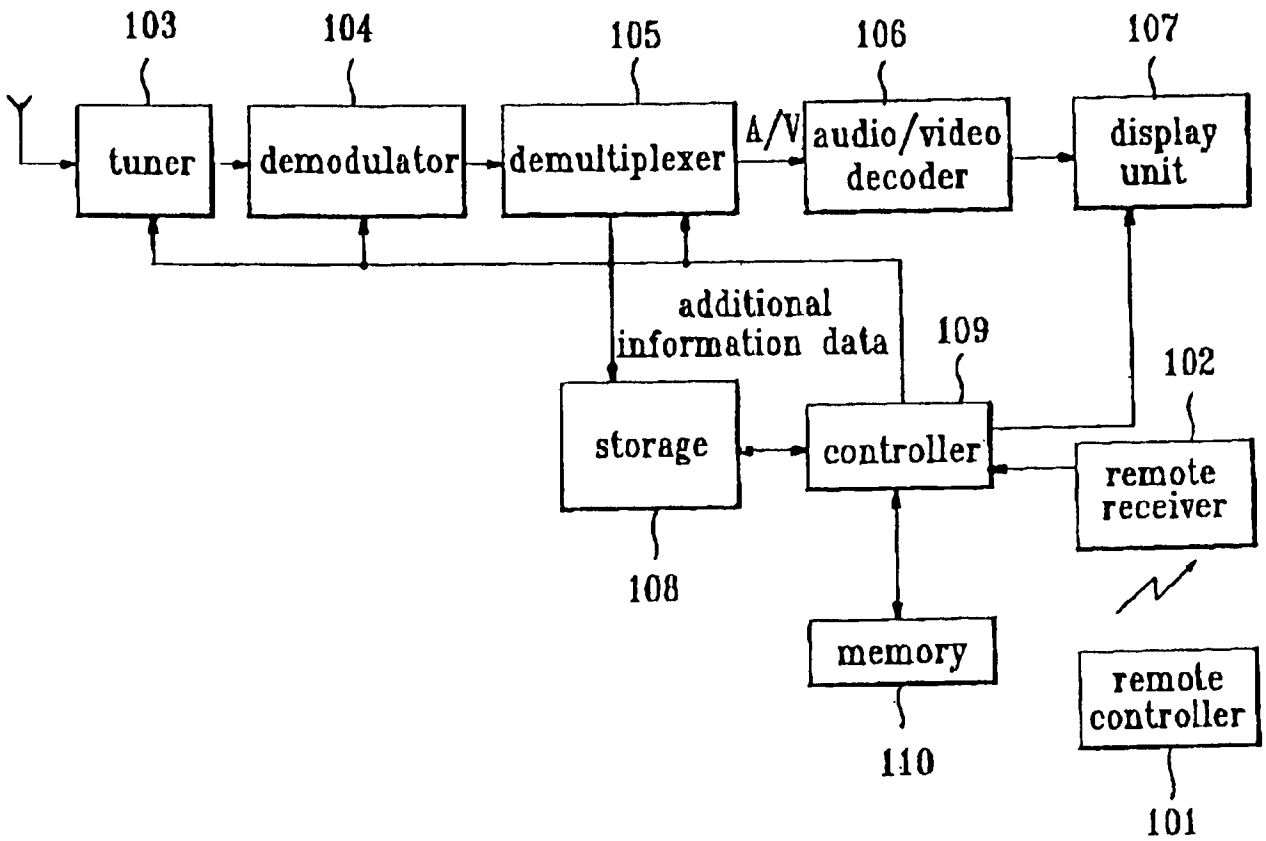
FIG.1 Background Art
FIG. 1 is a block diagram of a digital TV receiver in the related art.

Referring to FIG. 2, the present apparatus for displaying additional information includes a selector 101 such as a remote control, a remote receiver 102, a tuner 103, a demodulator 104, a demultiplexer 105, an A/V decoder 106, a display 107, a memory 110, and a controller 201 which operate as in the digital TV described with reference to FIG. 1. However, the present apparatus further includes a MODT decoder 202 which decodes additional information into a Media Object Description Table (MODT) data, an object data memory 203 which stores the MODT data, and a modem 204 which receives a variety of detail information from an external host or server such as the Internet and stores the received information in the object data memory 203 in response to a control signal from the controller 201.

In response to a signal from the remote receiver 102, the controller 201 controls the tuning by the tuner 103, the demodulation by the demodulator 104, the demultiplexing by the demultiplexer 105, and the storage and display of the additional information data. The controller 201 also extracts the MODT data from the object data memory 203, outputs a control signal corresponding to the MODT data, and outputs control signals to display the detail information.

Also, the object data memory 203 is generally a storage, and the memory 110 may be a RAM, wherein the memory 110 temporarily stores a data extracted from the object data memory 203 for display under the control of the controller 201. Moreover, the selector 101 may be a remote control, a panel selector attached to the display, such as the TV receiver, or a keyboard or connected to the TV receiver by a cable or radio signal. However, in the preferred embodiment, a remote control is used as the selector 101.

Figure 3:
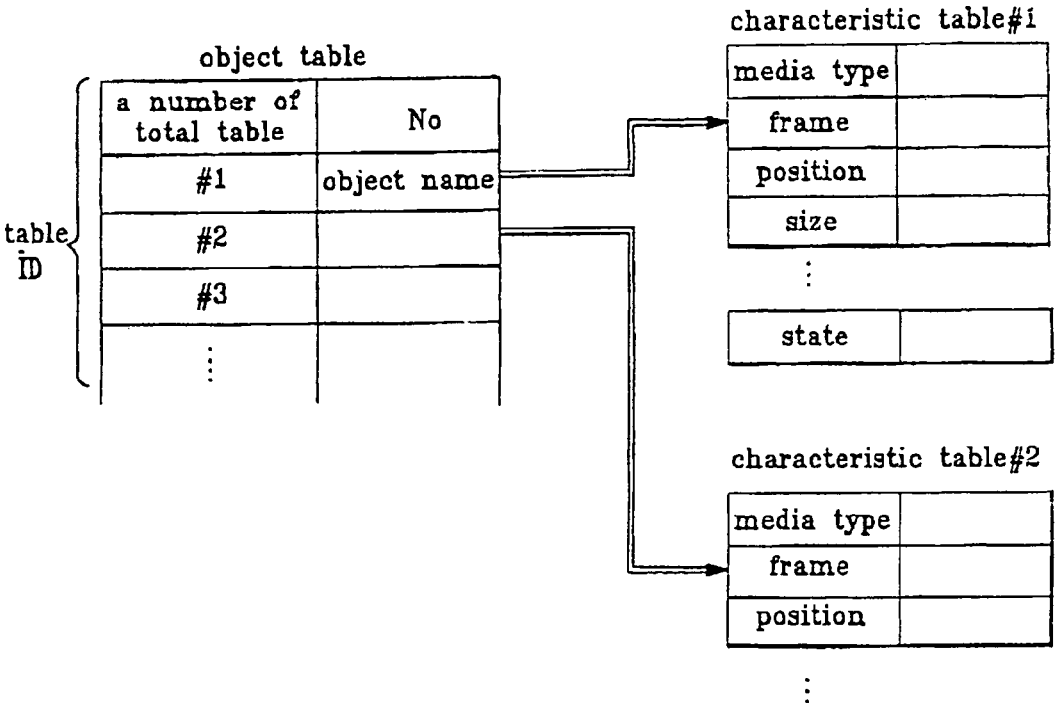
FIG. 3 is a block diagram showing one example of data stored in an object data memory of FIG. 2.

FIG. 3 shows an example of data stored in the object data memory 203 of FIG. 2. As shown, an object table including a number of tables, table IDs and object names for objects in a program is stored. Also, a characteristics table including information such as media type, a number of frames, positions, sizes and states of an object for each object corresponding to a table ID is stored. The operation of the present apparatus for displaying additional information will next be described.

The demultiplexer 105 demultiplexes the program selected by a user from a signal demodulated at the demodulator 104 and separates the program into the audio/video signals and the additional information data in response to a control signal from the controller 201. The audio/video signals are output to the audio/video decoder 106, and the additional information data is output to the MODT decoder 202.

The MODT decoder 202 detects detail information on objects being displayed on the display 107, decodes the detailed information into MODT data, and stores the MODT data. Here, the object may be a person or a thing(s) within a frame being displayed. That is, the MODT decoder 202 decodes the detail information on the objects being displayed from the additional information data; generates an object table showing a number of tables, table IDs, and object names for the program from the broadcasting station or the external program provides; and stores the object table in the object data memory 203. Moreover, the MODT decoder 202 generates a characteristic table including spatial and temporal information on each object, such as media type, a number of frames, positions, sizes, and states of the object each object in the object table; and stores the characteristic table in the object data memory 203. The media type is, for example, an audio, a video, or a character.

Thus, the controller 201 informs a user that there is detail information on objects in addition to the program being displayed. The existence of detail information on an object may be informed using any one sense of a user such as sight or sound. For example, an identification figure, such as an icon or a list in a form of menu may be used. In the latter case, object names having corresponding detail information may be listed on the menu.

Accordingly, a user may press or select a key on the remote control 101 to request a display of the detail information on an object upon noticing the message that there is detail information on objects in the program being displayed. The remote receiver 102 then receives a signal from the remote control 101, and outputs to the controller 201 a signal for requesting a display of the detail information on the selected object. The controller 201 extracts the detail information corresponding to the selected object from the object data memory 203, temporarily stores the extracted information in the memory 110, and reads and displays the detail information from the memory 110 on the display unit 107 at a preset position around the selected object of the program being displayed. Namely, detail information on all or one object(s) selected by the remote control 101 is displayed at a preset position around a corresponding object.

However, if the user wishes to view more detail information than the currently displayed information, the user may press a predetermined key on the remote control 101 to request for more detail information. The remote receiver 102 then receives a signal from the remote control 101 and outputs to the controller 201 a signal to request for more detail information. In response, the controller 201 automatically extracts a list of possible items that the user may wish to view from the data stored in the object data memory 203; and displays the list on the display 107 at a preset position of a program being displayed.

An example of a list automatically extracted is as follows. If the program being displayed is a relay broadcasting of a baseball game in which Chanho-Park appears, the list may include Chanho-Park, LA Dodgers, or the Major League. If a user finds interest in an item automatically extracted and displayed, the user may press or select a key on the remote control 101 to request a further display. Otherwise, the user may enter a request for a desired information directly by means of a character input feature on the remote control 101. The remote receiver 102 receives a signal from the remote control 101, and outputs to the controller 201 a signal to search for the information requested by the user.

In response, the controller 201 controls the modem 204, a modulator and a demodulator, and connects to the Internet or other network outside of the TV receiver to search for the requested information. The controller 201 stores a result of the search in the object data memory 203. Here, the connection to the Internet may be by cable or radio depending on the type of the modem 204. Also, if a direct connection is formed to a modem of a program provider, the detail information may be obtained through a server or host of the program provider.

Thus, the controller 201 extracts further detail information obtained through the modem 204 from the object data memory 203, loads the extracted information on the memory 110, and displays the requested information, i.e. the detail information, on the display 107 at a preset position of a program being displayed.

Furthermore, even if the additional information data does not include detail information on each object, i.e. includes simply information on the program itself, the additional information data from the demultiplexer 105 is stored in the object data memory 203 and reception of the additional information data is informed to the user. Thus, if a user wishes to view detail information on an object while viewing the additional information such as the EPG information, a user may press or select a key on the remote control 101 to request a display of the detail information on an object.

As in obtaining further detail information other than the information included in the additional information, the controller 201 controls the modem 204, a modulator and a demodulator, and connects to the Internet or other network outside of the TV receiver to search for the detail information. The controller 201 stores a result of the search in the object data memory 203. Here also, the connection to the Internet may be by cable or radio depending on the type of the modem 204 and the detail information may be obtained through a server or host of the program provider if a direct connection is formed to a modem of a program provider.

Thus, the controller 201 extracts the detail information obtained through the modem 204 from the object data memory 203, loads the extracted information on the memory 110, and displays the detail information on the display 107 at a preset position of a program being displayed. Alternatively, the controller 201 may automatically extract a list of possible items that the user may wish to view from the data stored in the object data memory 203; and displays the list on the display 107 at a preset position of a program being displayed such that a user may select an item of interest. In such case, the controller 201 would extract and display the detail information corresponding to the selected item from the memory 110.

Therefore, in the present apparatus, a search for detail information may be made if the additional information does not include a detail information, or a search for further detail information not included in the additional information may be made through a modem. Also, in the above embodiment, the searched information is stored in the object data memory 203 when a search for information is requested through the modem. However, the searched information may alternatively be displayed as a list in the form of a menu at a preset position of the TV screen. Thus, a user may select and display a particular information from the list using the remote control. Moreover, the menu may allow the user to store the searched information in the object data memory 203, if desired.

Therefore, the apparatus and method for displaying additional information according to the present invention allows a user to view detail information on objects in a program, where the detail information is obtained from the additional information and/or from an external source such as the Internet or other network. As a result, demands for detail information from users may be met, thereby overcoming the limitations on the amount of data that can be transmitted from broadcasting stations or program providers to a TV receiver.

The foregoing embodiments are merely exemplary and are not to be construed as limiting the present invention. The present teachings can be readily applied to other types of apparatuses, systems and methods. The description of the present invention is intended to be illustrative, and not to limit the scope of the claims. Many alternatives, modifications, and variations will be apparent to those skilled in the art.

What is claimed is:

1. An apparatus for displaying additional information *in an Electronic Program Guide* (*EPG*), the apparatus comprising:

a selector which receives a program selection input from a user and which includes a key for requesting detail information on a selected object in a selected program;

a data processor which receives broadcasting signals, selects and demodulates from the received broadcasting signals the selected program, and separates additional information from the demodulated signal;

a *Media Object Description Table* (*MODT*) decoder which detects from the additional information, detail information on each of certain objects in the selected program being displayed, and decodes the detail information into a plurality of object information, *wherein the object information includes an object table including program information*;

a storage which stores the plurality of object information;

a display which displays an object information stored in the storage when the user, through said key on the selector, requests to view detail information on a particular object being displayed in the selected program and selected by the user from the objects displayed in the selected program, where said object information corresponds to the object being displayed and selected by the user;

a controller which controls the separation of the additional information, the decoding of the detail information, the storing of the plurality of object information, and the display of the object information; and a connector through which the controller connects to an external source to obtain detail information in response to a request from the user to view detail information, wherein the controller connects to a network to search for the detail information requested by the user when said detail information is not included in the additional information.

2. An apparatus for displaying additional information *in an Electronic Program Guide* (*EPG*), the apparatus comprising:

a selector which receives a program selection input from a user and which includes a key for requesting detail information on a selected object in a selected program;

a data processor which receives broadcasting signals, selects and demodulates from the received broadcasting signals the selected program, and separates additional information from the demodulated signal;

a *Media Object Description Table* (*MODT*) decoder which detects from the additional information, detail information on each of certain objects in the selected program being displayed, and decodes the detail information into a plurality of object information;

a storage which stores the plurality of object information, *wherein the object information includes an object table including program information*;

a display which displays an object information stored in the storage when the user, through said key on the selector, requests to view detail information on a particular object being displayed in the selected program and selected by the user from the objects displayed in the selected program, where said object information corresponds to the object being displayed and selected by the user;

a controller which controls the separation of the additional information, the decoding of the detail information, the storing of the plurality of object information, and the display of the object information; and a connector through which the controller connects to an external source to obtain detail information in response to a request from the user to view detail information, wherein the controller connects directly to a host or a server in a program provider to obtain the detail information requested by the user when said detail information is not included in the additional information.

3. An apparatus of claim 1, wherein the plurality of object information are stored in an object table according to object names and wherein each object name has a corresponding characteristic table which includes detailed information.

4. An apparatus of claim 3, wherein the characteristic table includes media type, a number of frames, positions, sizes and states of an object.

5. An apparatus of claim 1, wherein the controller indicates to the user that there is detail information on objects in addition to the program being displayed.

6. An apparatus of claim 5, wherein the controller indicates to the user that there is detail information on objects by displaying an item list in a form of a menu on the display at a predetermined position.

7. An apparatus of claim 1, wherein the selector is one of a panel key attached to the display, a remote control, a keyboard or a mouse.

8. A method for displaying additional information *in an Electronic Program Guide* (*EPG*), the method comprising:

receiving a program selection input from a user through a selector which includes a key for requesting detail information on a selected object in a selected program;

receiving broadcasting signals, selecting and demodulating from the received broadcasting signals a program selected by the user through the selector, and separating additional information from the demodulated signal;

detecting from the additional information, detail information on each of certain objects in the selected program being displayed, and decoding the detail information into a plurality of object information, *wherein the object information includes an object table including program information*;

storing the plurality of object information;

displaying an object information stored when the user requests to view detail information on a particular object being displayed in the selected program and selected by the user from the objects displayed in the selected program, where said object information corresponds to the object being displayed and selected by the user, and connecting to an external source to obtain detail information in response to a request from the user to view detail information, wherein the connecting step connects to a network to search for the detail information requested by the user when said detail information is not included in the additional information.

9. A method of claim 8, wherein said detail information not included in additional information is requested by inputting characters through the selector.

10. A method for displaying additional information *in an Electronic Program Guide* (*EPG*), the method comprising:

receiving a program selection input from a user through a selector which includes a key for requesting detail information on a selected object in a selected program;

receiving broadcasting signals, selecting and demodulating from the received broadcasting signals a program selected by the user through the selector, and separating additional information from the demodulated signal;

detecting from the additional information, detail information on each of certain objects in the selected program being displayed, and decoding the detail information into a plurality of object information, *wherein the object information includes an object table including program information*;

storing the plurality of object information;

displaying an object information stored when the user requests to view detail information on a particular object being displayed in the selected program and selected by the user from the objects displayed in the selected program, where said object information corresponds to the object being displayed and selected by the user; and connecting to an external source to obtain detail information in response to a request from the user to view detail information, wherein the connecting step connects directly to a host or a server in a program provider to obtain the detail information requested by the user when said detail information is not included in the additional information.

11. A method of claim 8, wherein the storing step stores the plurality of object information in an object table according to object names and wherein each object name has a corresponding characteristic table which includes detailed information.

12. A method of claim 11, wherein the characteristic table includes media type, a number of frames, positions, sizes and states of an object.

13. A method of claim 8, further comprising informing a user that there is detail information on objects in addition to the program being displayed.

14. A method of claim 13, wherein the informing step indicates to the user that there is detail information on objects by displaying an item list in a form of a menu on the display at a predetermined position.

15. A method of claim 8, wherein the selector is one of a panel key attached to the display, a remote control, a keyboard or a mouse.

16. An apparatus of claim 1, wherein the selected object is a person or an item displayed as part of the selected program being displayed.

17. A method of claim 8, wherein, in the displaying step, the selected object is a person or an item displayed as part of the selected program being displayed.

18. An apparatus for displaying information on objects of a program *in an Electronic Program Guide* (*EPG*), the apparatus comprising:

a user input unit to receive a user's selection of a program;

a processor to receive broadcast signals, obtain the selected program and additional information from the broadcast signals, detect from the additional information any detail information on each of certain objects of the selected program, and decode the detail information into object information, *wherein the object information includes an object table including program information*;

a storage to store the object information;

a display unit to display the selected program; and a controller to receive the user's selection of a particular object of the selected program and the user's request to view detail information on the selected particular object, and to control the display unit to display an object information stored in the storage unit and corresponding to the selected particular object when the user requests to view detail information on the selected particular object, wherein the controller connects to a different source to obtain the detail information requested by the user when said detail information is not included in the additional information.

19. The apparatus claim 18, wherein the different source is a communication network, or a host in a program provider.

20. A method for displaying information on objects of a program *in an Electronic Program Guide* (*EPG*), the method comprising:

receiving a user's selection of a program;

receiving broadcast signals, obtaining the selected program and additional information from the broadcast signals, detecting from the additional information any detail information on each of certain objects of the selected program, and decoding the detail information into object information;

storing the object information;

*displaying the object information stored when* in response to the user's selection of a particular object of the selected program and the user's request to view detail information on the selected particular object, displaying an object information stored and corresponding to the selected particular object; and connecting to a different source to obtain the detail information requested by the user when said detail information is not included in the additional information.

21. The method of claim 20, wherein, in the connecting, the different source is a communication network, or a host in a program provider.

*22. An apparatus for displaying information on objects of a program in an Electronic Program Guide* (*EPG*), *the apparatus comprising:*

*a user input unit to receive a user's selection of a program;*

*a processor to receive broadcast signals, obtain the selected program and additional information from the broadcast signals, detect from the additional information any detail information on each of certain objects of the selected program, and decode the detail information into object information, wherein the object information includes an object table including program information;*

*a storage to store the object information;*

*a display unit to display the selected program; and*

*a controller to receive the user's selection of a particular object of the selected program and the user's request to view detail information on the selected particular object, and to control the display unit to display an object information stored in the storage unit,*

*wherein the controller connects to a different source to obtain the detail information requested by the user when said detail information is not included in the additional information.*

*23. The apparatus claim 22, wherein the different source is a communication network, or a host in a program provider.*

* * * * *